(12) United States Patent
Nakai et al.

(10) Patent No.: US 7,767,285 B2
(45) Date of Patent: *Aug. 3, 2010

(54) PHASE-CHANGE OPTICAL RECORDING MEDIUM

(75) Inventors: Tsukasa Nakai, Hino (JP); Sumio Ashida, Yokohama (JP); Keiichiro Yusu, Yokohama (JP); Takayuki Tsukamoto, Kawasaki (JP); Noritake Oomachi, Yokohama (JP); Naomasa Nakamura, Yokohama (JP); Katsutaro Ichihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 11/709,186

(22) Filed: Feb. 22, 2007

(65) Prior Publication Data

US 2007/0148396 A1    Jun. 28, 2007

Related U.S. Application Data

(62) Division of application No. 11/503,248, filed on Aug. 14, 2006, now abandoned, which is a division of application No. 10/972,768, filed on Oct. 26, 2004, now Pat. No. 7,214,416.

(30) Foreign Application Priority Data

Oct. 29, 2003    (JP)    ............................ 2003-369336

(51) Int. Cl.
*B32B 3/02*    (2006.01)

(52) U.S. Cl. .................... 428/64.1; 428/64.4; 428/64.5; 428/64.6; 430/270.13

(58) Field of Classification Search ................ 428/64.4, 428/64.5, 64.6; 430/270.13
See application file for complete search history.

(56) References Cited

U.S. PATENT DOCUMENTS

| 6,449,239 | B1 | 9/2002 | Uno et al. |
| 6,703,098 | B2 | 3/2004 | Hirotsune et al. |
| 6,775,226 | B1 | 8/2004 | Miyamoto et al. |
| 7,008,681 | B2 | 3/2006 | Kitaura et al. |
| 7,009,930 | B1 | 3/2006 | Uno et al. |

(Continued)

FOREIGN PATENT DOCUMENTS

JP    10-255324    9/1998

(Continued)

OTHER PUBLICATIONS

T. Inase et al., "Investigation of Protective Layer for High Transfer Rate Phase Change Optical Disk," Tokyo Research Lab., Tosoh Corp., pp. 37-42 (Proceedings of the 13$^{th}$ Symposium of Phase Change Optical Information Storage Digest (Dec. 6, 2001)).

(Continued)

*Primary Examiner*—Elizabeth Mulvaney
(74) *Attorney, Agent, or Firm*—Pillsbury Winthrop Shaw Pittman, LLP

(57) ABSTRACT

A phase-change optical recording medium has a recording film that brings about reversible phase-change between a crystalline phase and an amorphous phase upon irradiation with light and an interface film formed in contact with at least one surface of the recording film and comprising hafnium (Hf), silicon (Si), oxygen (O) and carbon (C).

2 Claims, 1 Drawing Sheet

U.S. PATENT DOCUMENTS

| | | |
|---|---|---|
| 2003/0138669 A1* | 7/2003 | Kojima et al. .......... 428/694 ST |
| 2004/0121261 A1 | 6/2004 | Ashida et al. |
| 2005/0019695 A1 | 1/2005 | Kojima et al. |

FOREIGN PATENT DOCUMENTS

| | | |
|---|---|---|
| JP | 11-213446 | 8/1999 |
| JP | 11-339311 | 12/1999 |
| JP | 2000-173103 | 6/2000 |
| JP | 2000-222777 | 8/2000 |
| JP | 2000-322770 | 11/2000 |
| JP | 2001-232941 | 8/2001 |
| JP | 2002-279693 | 9/2002 |
| JP | 2002-293025 | 10/2002 |
| JP | 2002-312978 | 10/2002 |
| JP | 2002-352472 | 12/2002 |
| JP | 2003-67974 | 3/2003 |
| JP | 2003-178487 | 6/2003 |
| JP | 2003-233931 | 8/2003 |
| WO | 03/025923 | 3/2003 |

OTHER PUBLICATIONS

Rie Kojima et al., "Ge-Sn-Sb-Te Phase-change Recording Material Having High Crystallization Speed," Optical Disk Systems Development Center, Matsushita Electric Industrial Co., Ltd., pp. 36-41 (Proceedings of PCOS 2000, Nov. 30-Dec. 1, 2000).

Mayumi Uno et al., "Acceleration of crystallization process by nitride interface layer," Optical Disk Systems Development Center, Matsushita Electric Industrial Co., Ltd., pp. 85-90 (Proceedings of the 10$^{th}$ Symposium on Phase Change Optical Information Storage (Nov. 1998)).

Michiaki Shinotsuka et al., "High-speed Blue-laser Recording on the Double-decker Phase Change Disk with High-Reliability," Research and Development Group, Ricoh Company, Ltd., IEEE 2002, pp. 234-236 (Jul. 7, 2002).

Toshio Inase et al., "Development of a New Protective Layer for Rewritable Digital Versatile Disks," TSOH Research & Technology Review, vol. 46, 2002, pp. 17-23.

Japanese Office Action dated Oct. 14, 2008 for Appln. No. 2006-307239.

* cited by examiner

PHASE-CHANGE OPTICAL RECORDING MEDIUM

CROSS-REFERENCE TO RELATED APPLICATIONS

This application is a divisional of U.S. application Ser. No. 11/503,248, filed Aug. 14, 2006, now abandoned which is a divisional of U.S. application Ser. No. 10/972,768, filed Oct. 26, 2004, now U.S. Pat. No. 7,214,416 and for which priority is claimed under 35 U.S.C. §121. This application is based upon and claims the benefit of priority under 35 U.S.C. §119 from the prior Japanese Patent Application No. 2003-369336, filed Oct. 29, 2003. Each above-identified application, in its entirety, is incorporated herein by reference thereto, respectively.

BACKGROUND OF THE INVENTION

1. Field of the Invention

The present invention relates to a phase-change optical recording medium in which a reversible phase-change between the crystalline and amorphous phases is brought about by light beam irradiation so as to record information.

2. Description of the Related Art (Principle of Phase-Change Optical Recording Medium)

The phase-change optical recording medium, which uses a phase-change optical recording film that permits bringing about a reversible phase-change between the crystalline and amorphous phases upon irradiation with a light beam, operates according to the following principle. That is, recording is performed by heating the region irradiated with a light beam to temperatures higher than the melting point of the film so as to melt the irradiated region, followed by rapidly cooling the molten region so as to change atomic arrangement in the cooled region in a manner to form an amorphous phase. Erasure is performed by maintaining for at least a prescribed time the temperature of the region irradiated with the light beam such that the temperature falls within a range between a level not higher than the melting point and a level not lower than the crystallizing temperature. In this stage, in the case where the initial state is crystalline, the crystalline phase is maintained, and in the case where the initial state is amorphous, the amorphous phase is changed into the crystalline phase. Reading is performed by converting the intensity of the reflected light into the intensity of an electrical signal by utilizing the phenomenon that the intensity of the reflected light from the amorphous region differs from that of the reflected light from the crystalline region, followed by subjecting the electrical signal to analog-to-digital conversion.

It should noted that the recording-reading can be performed by utilizing phase-change between a metastable crystalline phase and a stable crystalline phase as in martensite or phase-change among metastable crystalline phases as well as the phase-change between the crystalline phase and the amorphous phase noted above.

(Methods for Increasing Recording Density)

The amount of information that can be recorded on a single recording medium, i.e., the recording capacity, is considered to be increased by the two methods described below.

A first method is to shorten the pitch of the recording marks in the track direction. In this method, however, when the pitch between recording marks is significantly reduced, the pitch will be smaller than the size of a read beam. In such a case, two recording marks may be included temporarily in a read beam spot. Where the recording marks are sufficiently separated from each other, the read signal is greatly modulated so as to make it possible to obtain a signal having high amplitude. However, where the recording marks are close to each other, the obtained signal has low amplitude, with the result that errors tend to occur in the stage of converting the obtained signal into digital data.

Another method for improving the recording density is to shorten the track pitch. This method makes it possible to increase the recording density without being affected significantly by decrease in the signal intensity that is caused by the mark pitch reduction noted above. In this method, however, a so-called cross-erase problem is generated. Specifically, if the track pitch is made substantially equal to or smaller than a light beam size, the information in a certain track deteriorates when writing or erasure is performed on the adjacent track.

The cross-erase problem is generated partly because the mark on the target track is irradiated directly with the edge of the laser beam on the adjacent track, and partly because heat generated in the recording stage flows into the adjacent track so as to raise the temperature of the mark on the adjacent track and, thus, to deform the mark. In order to increase the recording density of the phase-change optical recording medium, it is necessary to overcome the problems pointed out above. Also, in order to suppress the probability of read errors for small recording marks to a low level, it is desirable that the recording marks be formed in a manner to have an even contour so as to suppress noise components as much as possible.

(Increase in Recording Capacity by Using Dual-Layer Disc)

Another method for increasing the recording capacity is to stack a plurality of information layers each including a phase-change optical recording film (see Japanese Patent Disclosure (Kokai) No. 2000-322770). The recording medium that is designed such that two information layers are stacked one upon the other and the information is written to and read from one side is called a single-sided, dual-layer disc or is simply called a dual-layer disc. It is possible to stack two single-sided, dual-layer discs so as to form a double-sided, quadruple-layer disc for further increasing the recording capacity. In the single-sided, dual-layer disc, it is necessary for the information layer close to the light incident side, which is hereinafter called L0, to have at least about 50% of transmittance. This is because it is important to prevent the light from being attenuated excessively in the information layer L0 close to the light incident side in accessing to the information layer remote from the light incident side, which is hereinafter referred to as L1. Such being the case, it is necessary for the phase-change optical recording film included in the L0 information layer to be very thin, i.e., not thicker than 10 nm. In the case of such a thin recording film, the retention time required for the crystallization is prolonged, with the result that the recording mark fails to be erased completely at the normal recording speed (reduction of erasure rate).

As a measure against the difficulty, it is known that it is effective to substitute Sn for a part of the GeSbTe recording film (Proceedings of The 12th Symposium on Phase-Change Optical Information Storage PCOS 2000, pp. 36-41). Also, it is known that it is effective to substitute Bi, In, Sn and Pb for a part of the GeSbTe recording film (see Japanese Patent Disclosure No. 2001-232941). However, in order to compensate for the crystallizing speed that is reduced in accordance with the decrease in the thickness of the recording film, it is insufficient to simply take a measure such as a change in the composition of the recording film material. Such being the case, it has been proposed to arrange an interface film effective for promoting the crystallization at the interface with the recording film. For example, it has been proposed to arrange a germanium nitride (GeN) film, a silicon carbide (SiC) film or a silicon nitride ($SiN_x$) film as the interface film (see "Proceeding" referred to above). However, as a result of extensive research conducted by the present inventors, it has been found that cross-erase is generated in the combination of the thin recording film having a thickness of 5 to 7 nm and the conventional interface film such as GeN and, thus, it is difficult to sufficiently shorten the track pitch. It has also been found that any of the interface films referred to above has a high extinction coefficient in the wavelength of the laser light (405 nm) used in the next-generation high-density optical disc, incurring a very high optical loss.

In contrast, the recording medium in which the interface film is not arranged permits suppressing the recrystallization of the molten portion so as to suppress the cross-erase to a low level, but has an insufficient erasure rate. Also, in the L1 information layer, it is necessary to perform recording and erasure by laser light the intensity of which has been halved as a result of the passage through the L0 information layer. It follows that an increase in sensitivity of the recording medium is required.

(Methods for High-Speed Recording)

High-speed recording is also required for the phase-change optical recording medium. For example, if the recording can be performed in a time shorter than the actual viewing time, it is possible to easily realize the so-called "time-shift function" that the previous images can be viewed in the copying stage of the distributed recording medium or during the real-time recording of the broadcasting images. However, one of the factors for inhibiting the high-speed recording in the phase-change optical recording medium is a problem that the information fails to be erased completely when crystallization is performed in the overwriting stage by a laser beam at a relatively low erasure level, i.e., the problem of the insufficient erasure rate. To be more specific, since the recording mark passes through the laser spot at a high speed, it is difficult to maintain the recording mark for a sufficiently long time in temperature range within which the crystallization can be performed, with the result that the information fails to be erased completely.

Japanese Patent Disclosure No. 11-213446 discloses that an interface film formed of a material such as GeN is arranged in contact with the recording film so as to promote the crystallization and, thus, to increase the erasure rate. However, as a result of experiments conducted by the present inventors in which the material disclosed in the above Disclosure was used as the interface film, it has been found that the portion molten in the recording stage is partially recrystallized, and that it is necessary to melt a region larger than the recording mark in order to form a recording mark of a required size. It should be noted that the use of the interface film noted above requires makes it necessary to melt the region larger than required, resulting in promotion of the cross-erase, which brings about an adverse effect in terms of high-density recording. In other words, if the recording is performed using a laser power within an acceptable range in terms of the cross-erase, the width of the formed recording mark is made small, which brings a lowered carrier-to-noise ratio (CNR). On the other hand, the recording medium having no interface film permits suppressing the recrystallization in the molten portion so as to suppress the cross-erase to a low level, but the medium has an insufficient erasure rate. Therefore, it is desirable to develop a novel interface film material that permits suppressing the recrystallization in the molten portion in the recording stage while promoting the crystallization rate in the erasure stage.

(Interface Film Material)

A material containing a mixture of $Ta_2O_5$ and SiC as main components, which is a material for a sulfur-free protective film, is known as a material that can be used for an interface film capable of promoting crystallization (see Japanese Patent Disclosure No. 2003-67974). This prior art of Japanese Patent Disclosure No. 2003-67974 is mainly intended to improve the DVD using the wavelength λ of 650 nm of the laser diode (LD) that is widely used nowadays. However, the material disclosed in the Disclosure is opaque to the wavelength λ of 405 nm of the next-generation blue LD, leading to a higher optical loss. Therefore, problems remain unsolved when the particular interface film is used in the next-generation recording medium having a high recording density. Thus, an interface material which is optically transparent to the wavelength λ of 405 nm and capable of promoting the crystallization, has not yet been developed.

(Film Design of Phase-Change Optical Recording Medium)

In the phase-change optical recording medium, an amorphous mark or data is written in a desired portion of the recording film by irradiating the desired portion of the recording film with a pulsed laser beam. In contrast, the recording film is irradiated with a laser beam so as to crystallize the amorphous mark, thereby erasing the data. In the former stage, an amorphous mark is formed by rapidly cooling the laser beam-irradiated portion, and in the latter stage, the amorphous portion is crystallized by gradually cooling the laser beam-irradiated portion. Also, the recording and erasure can be performed with a lower laser power when the absorbance in the recording film is high. In contrast, a higher laser power is required for the recording and erasure when the absorbance in the recording film is low. It should be noted that the absorbance in the recording film is determined by the optical characteristics of the recording medium formed of a multi-layered film. What is also important is the thermal design relating to the film structure as to, for example, whether a rapid cooling structure is employed, even if the absorbance is the same. Thus, in the film design of the phase-change optical recording medium, the optical design and the thermal design are mainly taken into consideration. For the optical design, the optical characteristics of each thin film are required. Also, for the thermal design, the thermal properties including the melting point of each thin film, the latent heat of melting, and the crystallization temperature are required. It should be noted in this connection that it has been clarified by some researches that the thermal properties of a thin film in a nanometer order differ from those of the bulk. However, the thermal properties of the thin film could not be measured while eliminating the effects of the other factors. Therefore, empirical parameters for correcting the above thermal properties are required.

BRIEF SUMMARY OF THE INVENTION

A phase-change optical recording medium according to an aspect of the present invention comprises: a recording film that brings about reversible phase-change between a crystalline phase and an amorphous phase upon irradiation with light; and an interface film formed in contact with at least one surface of the recording film and comprising hafnium (Hf), silicon (Si), oxygen (O) and carbon (C).

A phase-change optical recording medium according to another aspect of the present invention comprises: a recording film that brings about reversible phase-change between a crystalline phase and an amorphous phase upon irradiation with light; and an interface film formed in contact with at least one surface of the recording film, the interface film comprising: at least one element selected from the group A consisting of hafnium (Hf), zirconium (Zr), titanium (Ti), niobium (Nb), aluminum (Al), zinc (Zn), yttrium (Y), lanthanum (La), cerium (Ce), praseodymium (Pr), samarium (Sm), europium (Eu), gadolinium (Gd), terbium (Tb), dysprosium (Dy), holmium (Ho), erbium (Er), thulium (Tm), ytterbium (Yb) and ruthenium (Ru); oxygen (O); silicon (Si); and at least one element selected from the group B consisting of carbon (C) and nitrogen (N).

DETAILED DESCRIPTION OF THE INVENTION

Embodiments of the present invention will now be described in detail with reference to the accompanying drawings.

Figure 1:
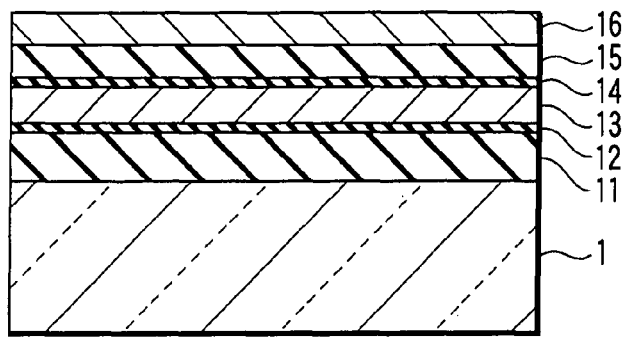
FIG. 1 is a cross-sectional view showing a phase-change optical recording medium according to one embodiment of the present invention.

FIG. 1 is a cross-sectional view of the phase-change optical recording medium according to an embodiment of the present invention. The phase-change optical recording medium shown in FIG. 1 includes a transparent substrate 1 and a stacked structure of films formed on the substrate 1. The stacked structure includes a first interference film 11, a lower interface film 12, a recording film 13, an upper interface film 14, a second interference film 15, and a reflective film 16. The recording film 13 is irradiated with light through the transparent substrate 1.

Also, in the case of a single-sided, dual-layer disc, a first information layer of the construction described above, which is positioned close to the light incident surface, and a second information layer of the construction described above, which is positioned remotely from the light incident surface are prepared. These two information layers are bonded to each other with an adhesive layer interposed therebetween, which is used as an interlayer separating layer.

Figure 2:
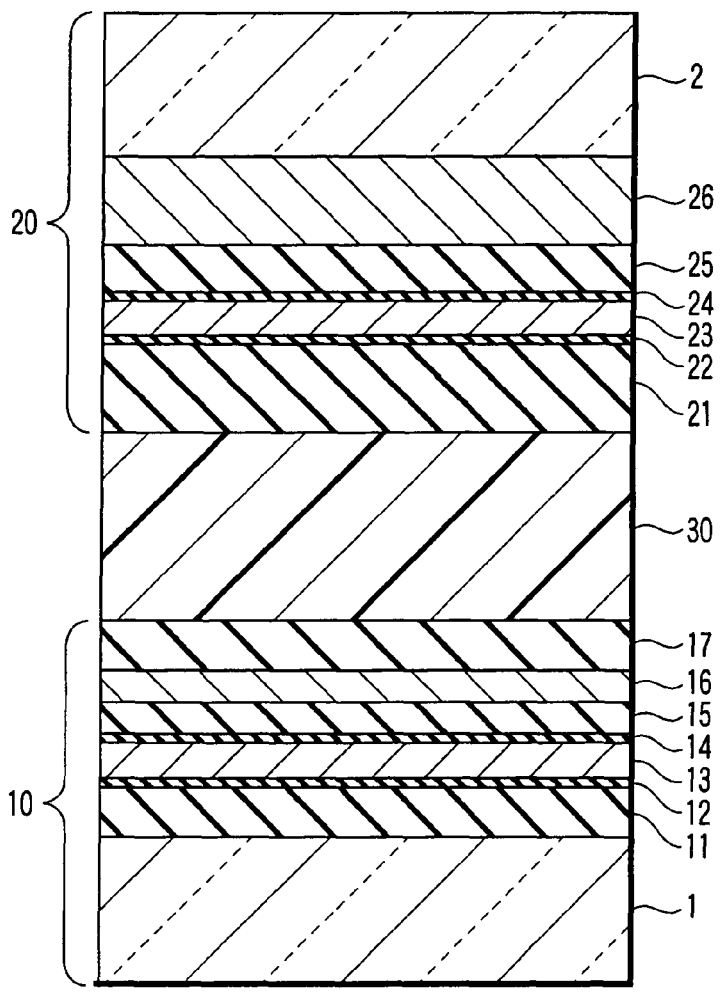
FIG. 2 is a cross-sectional view showing a single-sided, dual-layer phase-change optical recording medium according to another embodiment of the present invention.

FIG. 2 is a cross-sectional view of a single-sided, dual-layer phase-change optical recording medium according to another embodiment of the present invention. The phase-change optical recording medium shown in FIG. 2 has a structure that an L0 information layer (first information layer) 10 and an L1 information layer (second information layer) 20 are bonded to each other with an interlayer separating layer 30 formed of an adhesive layer. The L0 information layer 10 includes a transparent substrate 1 and a stacked structure of films formed on the substrate 1. The stacked structure includes a first interference film 11, a lower interface film 12, a recording film 13, an upper interface film 14, a second interference film 15, a reflective film 16, and a third interference film 17, which are stacked one upon the other in the order mentioned as viewed from the transparent substrate 1. The L1 information layer 20 includes a transparent substrate 2 and a stacked structure of films formed on the substrate 2. The stacked structure includes a reflective film 26, a second interference film 25, an upper interface film 24, a recording film 23, a lower interface film 22, and a first interference film 21, which are stacked one upon the other in the order mentioned as viewed from the transparent substrate 2.

Incidentally, the construction of the phase-change optical recording media according to embodiments of the present invention is not limited to those shown in FIGS. 1 and 2. For example, it is possible to arrange another dielectric film between the second interference film and the reflective film. It is also possible to substitute the materials of the interface film for all the interference films and, thus, to omit the interference films. It is also possible to omit the reflective film. Further, it is possible for the reflective film to be formed of a plurality of metal films.

Further, it is possible for the phase-change optical recording medium of the present invention to be of the type that various kinds of films are stacked one upon the other on a substrate, and a thin transparent sheet having a thickness of about 0.1 mm is bonded to the uppermost film of the stacked structure of films formed on the substrate such that the light is incident on the recording film through the transparent sheet. In the optical recording medium of this type, it is assumed to use an objective lens having a high numerical aperture of about 0.85.

In the following description of the phase-change optical recording medium according to the embodiments of the present invention, the interface film should be interpreted to be "formed in contact with" the phase-change optical recording film unless another film is intentionally formed between the phase-change optical recording film and the interface film. Therefore, even where a very thin oxide film having a thickness of 2 nm or less, which is naturally formed during the deposition process, is detected on the surface of the phase-change optical recording film by, for example, Auger analysis, the interface film is regarded as being formed in contact with the phase-change optical recording film.

The present inventors have conducted experiments using materials such as germanium nitride (GeN), silicon carbide (Si—C), silicon nitride (Si—N) and $Ta_2O_5$+SiC, which are already known as interface film materials effective for promoting the crystallization of the recording film. As a result, it has been found that there is a trade-off relationship that the CNR value is lowered in the case of using a material producing a high effect of promoting the crystallization, and the effect of promoting the crystallization is lowered in the case of using a material effective for increasing the CNR value. Also, these materials excluding Si—N exhibit relatively high absorption in respect of the wavelength λ (405 nm) of the blue violet LD that is used in the next-generation DVD and has a high extinction coefficient, with the result that an optical loss is generated. The optical loss necessitates an increase in the laser power, inhibits the improvement in the transmittance of the L0 information layer, and lowers the sensitivity and the contrast of the L1 information layer, which produce various problems in the dual-layer disc.

On the other hand, the present inventors have found that the degree of the trade-off relationship noted above is particularly low and that it possible to obtain a high CNR value and to promote crystallization in the case of using a material for an interface film comprising: at least one element selected from the group A consisting of hafnium (Hf), zirconium (Zr), titanium (Ti), niobium (Nb), aluminum (Al), zinc (Zn), yttrium (Y), lanthanum (La), cerium (Ce), praseodymium (Pr), samarium (Sm), europium (Eu), gadolinium (Gd), terbium (Tb), dysprosium (Dy), holmium (Ho), erbium (Er), thulium (Tm), ytterbium (Yb) and ruthenium (Ru); oxygen (O); silicon (Si); and at least one element selected from the group B consisting of carbon (C) and nitrogen (N). It has also been found that it is possible to obtain a high transmittance and a high contrast simultaneously in the case of using the interface film material noted above for the manufacture of a dual-layer disc.

Among the materials of the interface film noted above, it is desirable to use a material containing hafnium (Hf), silicon (Si), oxygen (O), and carbon (C). Where the material of the interface film is represented by a general formula $HfSi_xO_yC_z$, where Hf=1, the values of x, y and z should fall desirably within the ranges of $0.1 \leq x \leq 0.4$, $1.8 \leq y \leq 4$, and $0.1 < z \leq 0.5$, more desirably within the ranges of $0.1 \leq x \leq 0.2$, $2.5 \leq y \leq 3.5$, and $0 < z \leq 0.1$. These compositions are selected to allow the interface film to be satisfactory in the function of promoting the crystallization and in the optical characteristics. To be more specific, where the values of x, y and z are allowed to fall within a range of between 0.1 and 0.4, within a range of between 1.8 and 4, and within a range of between 0 and 0.5, respectively, the function of promoting the crystallization was improved, the extinction coefficient was very low, and the cross-erase was low. Further, where the values of x, y and z are allowed to fall within a range of between 0.1 and 0.2, within a range of between 2.5 and 3.5, and within a range of between 0 and 0.1, respectively, the function of promoting the crystallization was further improved, and the extinction coefficient was substantially zero.

It is possible for the types of the compounds of each element contained in the material of the interface film represented by $HfSi_xO_yC_z$ to be (1) a mixture of hafnium oxide, silicon oxide, and silicon carbide, (2) a mixture of hafnium oxide and silicon oxide having carbon dispersed or diffused therein, and (3) a compound in which carbon is dispersed or diffused in hafnium silicate. Among these types, it is desirable to use the compound in which carbon is dispersed or diffused in hafnium silicate.

In the case of using an element of group A other than hafnium, it is possible for the types of the compounds of each element contained in the material of the interface film to be (1) a mixture of an oxide of the element of group A, silicon oxide, and silicon carbide, (2) a mixture of an oxide of the element of group A and silicon oxide having carbon dispersed or diffused therein, and (3) a compound in which carbon is dispersed or diffused in the silicate of the element of group A.

The interface film used in the embodiment of the present invention is advantageous in that the refractive index and/or the thermal conductive characteristics can be changed freely while maintaining a satisfactory function of promoting the crystallization. In other words, in the interface film used in the embodiment of the present invention, the thermal conductivity can be changed within a very wide range by suitably selecting the component ratio of each element, and the optical characteristics can also be changed within a very wide range by suitably selecting the component ratio of each element, particularly, the amount of carbon. For example, in the interface film of the present invention, the extinction coefficient can be set to a value of $1 \times 10^{-4}$ or less.

Also, in the interface film of the present invention, the behavior of promoting the crystallization, i.e., the crystallizing rate, can be controlled by adjusting the component ratio of each element, particularly, by controlling the carbon concentration.

The phase-change optical recording medium is heated by light absorption performed by the recording film and is cooled by heat transmission through films formed on the upper and lower surfaces of the recording film. In general, whether the recording film is made amorphous or crystalline is determined by the balance between the thermal conductive characteristics of the films formed on the upper and lower surfaces of the recording film and the crystallizing rate of the recording film in addition to the heat generation from the recording film that is dependent on the power, the linear speed and the irradiating time. It follows that, in order to form satisfactory recording marks and to obtain sufficient erasing characteristics at a desired linear speed, it is important to control the thermal conductivity of the films formed on the upper and lower surfaces of the recording film. In the interface film according to the present invention, the refractive index and the thermal conductive characteristics can be changed freely as described above so as to markedly facilitate the design of the film construction of the phase-change optical recording medium. Also, it is possible to omit the $ZnS:SiO_2$ protective film that was considered to be essential in the past and to substitute therefor the interface film material. In this case, the number of films forming the stacked structure can be decreased so as to make it possible to provide a phase-change optical recording medium that is excellent in manufacturing.

In the phase-change optical recording medium according to an embodiment of the present invention, it is desirable for the phase-change optical recording film to be formed of GeSbTe, particularly, to be formed of a pseudo-binary system represented by (GeTe)$_x$(Sb2Te3)$_y$. To be more specific, where the material of the phase-change optical recording film is represented by a general formula: $Ge_xSb_yTe_z$ (where x+y+z=100), it is desirable to use a material having a composition within a range surrounded by x=55, z=45; x=45, z=55; x=10, y=28, z=42; and x=10, y=36, z=54 in the ternary phase diagram of GeSbTe. In this case, it is possible for Sn to be substituted for a part of Ge and for Bi to be substituted for a part of Sb. To be more specific, it is desirable for the material of the phase-change optical recording film to have a composition represented by the general formula:

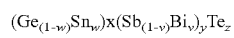

$$(Ge_{(1-w)}Sn_w)x(Sb_{(1-v)}Bi_v)_yTe_z$$

(where x+y+x=100, $0 \leq w < 0.5$, $0 \leq v \leq 1.0$). Table 1 shows the typical compositions of the material of the phase-change optical recording film.

TABLE 1

| No. | Composition |
|---|---|
| 1 | $Ge_{10}Sb_2Te_{13}$ |
| 2 | $Ge_4Sb_2Te_7$ |
| 3 | $Ge_8Sb_2Te_{13}Bi_2$ |
| 4 | $Ge_3Sb_2Te_7Bi$ |
| 5 | $Ge_6Sb_2Te_{13}Sn_4$ |
| 6 | $Ge_3Sb_2Te_7Sn$ |

Further, it is possible to use a recording film prepared by using a material prepared by adding small amount of elements other than Sn and Bi, e.g., Co, V and Ag, to GeSbTe, though the addition amount should be controlled not to impair the effect of the present invention.

It is also desirable for the phase-change optical recording film to be formed of a material represented by the general formula: $Ge_xBi_yTe_z$ (where x+y+z=100), having a composition within a range surrounded by x=55, z=45; x=45, z=55; x=10, y=28, z=42; and x=10, y=36, z=54 in the ternary phase diagram of GeBiTe.

In the embodiment of the present invention, the thickness of the recording film is not particularly limited. However, it is desirable for the thickness of the recording film to be 20 nm or less, more preferably, 10 nm or less. In particular, in the single-sided, dual-layer disc, the use of the interface film defined in the present invention permits making prominent the effect that a high transmittance and a high contrast can be obtained.

In the embodiments of the present invention, known materials can be used for the other films such as the interference film and the reflective film.

EXAMPLES

Examples of the present invention will now be described. In the following Examples, single-sided, dual-layer discs were manufactured.

Example 1

A polycarbonate (PC) substrate having a thickness of 0.59 mm, which was prepared by injection molding, was used as a substrate. Since grooves were formed on the substrate at a groove pitch of 0.68 μm, the track pitch was 0.34 μm in land-groove recording.

An L0 information layer was prepared by forming various films on the surface of a first substrate by sputtering, and an L1 information layer was prepared by forming various films on the surface of a second substrate by sputtering. The films are formed in different deposition chambers using the sputtering apparatus with multi process chambers.

To be more specific, a $ZnS:SiO_2$ film (first interference film), a lower interface film, a phase-change optical recording film, an upper interface film, a $ZnS:SiO_2$ film (second interference film), an Ag alloy film (reflective film), and a $ZnS:SiO_2$ film (thermal diffusion film) were formed successively on the surface of the first substrate in the order mentioned so as to prepare the L0 information layer. On the other hand, an Ag alloy film, a $ZnS:SiO_2$ film, an interface film, a-phase-change optical recording film, an interface film, and a $ZnS:SiO_2$ film were formed successively in the order mentioned on the surface of the second substrate so as to obtain the L1 information layer.

The recording film was formed by using $Ge_3Sb_2Te_7Bi$ shown in Table 1 as No. 4. The $ZnS:SiO_2$ film was formed by using as a target a mixture consisting of 80 atomic % of ZnS and 20 atomic % of $SiO_2$.

In Example 1, $HfSi_{0.1}O_{1.8}C_{0.001}$ was used for the interface film. According to the measurement performed by using a spectroscopic elypsometry, the extinction coefficient of the interface layer was zero (0).

By using an initializing apparatus, the recording film was crystallized over the entire region of each of the information layers. After the initialization, the first and second information layers were bonded to each other by using a UV-curing resin such that the deposited surfaces were arranged inside with the UV-curing resin layer so as to obtain a single-sided, dual-layer disc. The thickness of the UV-curing resin layer was about 25 μm. A disc evaluation apparatus of DDU-1000 manufactured by Pulstec Industrial Co., Ltd., was used for evaluating the disc. The apparatus was provided with a blue violet semiconductor laser having a wavelength of 405 nm and with an objective lens (NA=0.65). The recording experiment was conducted by the land-groove recording scheme (track pitch of 0.34 μm) under the condition that the linear speed was 5.6 m/sec. The four items given below were evaluated.

(1) Measurement of Bit Error Rate (SbER: Simulated Bit Error Rate):

The SbER measurement is for evaluating the error rate of the data. In the first step, a mark train containing patterns of 2T to 9T at random was overwritten 10 times in a prescribed initial track. Then, the same random patterns were overwritten 10 times in the adjacent tracks on both sides of the initial track. Further, the SbER value was measured on the initial track.

(2) Analog Measurement

The analog measurement is for evaluating the quality of the read signal. In the first step, a mark train containing patterns of 2T to 9T at random was overwritten 10 times. Then, a single pattern of 9T was overwritten once in the mark column, followed by measuring the carrier-to-noise ratio (CNR) of the signal frequency of the 9T mark by a spectrum analyzer. Further, the recording marks were irradiated with a laser beam of an erasure power level by one rotation of the disc so as to erase the recording marks. The amount of reduction in the signal intensity of the 9T mark after the laser beam irradiation was measured. The measured value was defined as an erasure rate (ER). Then, the head was moved to a track that was sufficiently separated from the original position so as to measure the cross-erase (E-X).

(3) Overwriting (OW) Test

After a random signal was overwritten 2,000 times in the same track, the bit error rate (SbER) was measured as described above.

(4) Environmental Test

After the manufactured disc was exposed to an environment having a temperature of 85° C. and a relative humidity of 85% for 300 hours, the bit error rate (SbER) was measured as described above.

The worst value among each land (L) and groove (G) for the L0 information layer and the L1 information layer is given as the representative value of each of the measured data.

The disc for Example 1 exhibited excellent results for each of the land and the groove such that the CNR was not lower than 54.6 dB, the erasure rate was not higher than −31 dB, and the cross-erase was not larger than −0.2 dB. Also, the bit error rate (SbER) before the environmental test was not higher than $2.0 \times 10^{-5}$ for each of the land and the groove, supporting that a practical error rate was obtained. Further, the bit error rate (SbER) after the overwriting test was excellent, i.e., not higher than $2.4 \times 10^{-5}$, and the bit error rate (SbER) after the environmental test was also excellent, i.e., not higher than $2.9 \times 10^{-5}$, for each of the land and the groove.

Examples 2 to 9

Discs of the construction equal to that of Example 1 were prepared by using various interface films. Specifically, interface films formed of $HfSi_{0.4}O_4C_{0.5}$, $HfSi_{0.1}O_{2.5}C_{0.1}$, $HfSi_{0.2}O_{3.5}C_{0.01}$, $HfSi_{0.15}O_{2.8}C_{0.001}$, $HfSi_{0.18}O_{3.1}C_{0.0001}$, $HfSi_{0.18}O_3C_{0.1}$, $HfSi_{0.17}O_{3.2}C_{0.01}$, and $HfSi_{1.6}O_{2.9}C_{0.0001}$ were used. Tests equal those applied in Example 1 were applied to the manufactured discs. The results of the tests are shown in Table 2. As is apparent from Table 2, good characteristics were obtained in each of Examples 2 to 9.

TABLE 2

| | Interface film | Extinction coefficient | Before environmental test CNR [dB] | Before environmental test SbER | After OW test SbER | After environmental test SbER |
|---|---|---|---|---|---|---|
| Example 1 | $HfSi_{0.1}O_{1.8}C_{0.001}$ | 0 | 54.6 | $2.0 \times 10^{-5}$ | $2.4 \times 10^{-5}$ | $2.9 \times 10^{-5}$ |
| Example 2 | $HfSi_{0.4}O_4C_{0.5}$ | $1.0 \times 10^{-4}$ | 53.2 | $1.9 \times 10^{-5}$ | $2.5 \times 10^{-5}$ | $2.8 \times 10^{-5}$ |
| Example 3 | $HfSi_{0.1}O_{2.5}C_{0.1}$ | $1.1 \times 10^{-5}$ | 53.8 | $2.4 \times 10^{-5}$ | $2.8 \times 10^{-5}$ | $2.9 \times 10^{-5}$ |
| Example 4 | $HfSi_{0.2}O_{3.5}C_{0.01}$ | 0 | 53.6 | $2.2 \times 10^{-5}$ | $2.6 \times 10^{-5}$ | $2.8 \times 10^{-5}$ |
| Example 5 | $HfSi_{0.15}O_{2.8}C_{0.001}$ | 0 | 52.1 | $2.4 \times 10^{-5}$ | $2.9 \times 10^{-5}$ | $2.9 \times 10^{-5}$ |
| Example 6 | $HfSi_{0.18}O_{3.1}C_{0.0001}$ | 0 | 53.9 | $1.8 \times 10^{-5}$ | $2.3 \times 10^{-5}$ | $2.9 \times 10^{-5}$ |
| Example 7 | $HfSi_{0.18}O_3C_{0.1}$ | $2.0 \times 10^{-5}$ | 52.8 | $2.2 \times 10^{-5}$ | $2.7 \times 10^{-5}$ | $2.8 \times 10^{-5}$ |
| Example 8 | $HfSi_{0.17}O_{3.2}C_{0.01}$ | 0 | 53.2 | $2.2 \times 10^{-5}$ | $2.9 \times 10^{-5}$ | $2.8 \times 10^{-5}$ |
| Example 9 | $HfSi_{1.6}O_{2.9}C_{0.0001}$ | 0 | 53.7 | $1.8 \times 10^{-5}$ | $2.8 \times 10^{-5}$ | $2.9 \times 10^{-5}$ |

Examples 10 to 50

Discs of the construction equal to that in Example 1 were prepared by changing the material of the interface film. The materials used for the interface films were HfSiOCN, HfSiON, ZrSiOC, ZrSiOCN, TiSiOC, TiSiON, NbSiOC, NbSiOCN, AlSiOC, AlSiOCN, ZnSiOC, ZnSiOCN, YSiOC, YSiON, LaSiOC, LaSiOCN, CeSiOC, CeSiON, PrSiOC, PrSiON, SmSiOC, SmSiOCN, EuSiOC, EuSiON, GdSiOC, GdSiOCN, TbSiOC, TbSiOCN, DySiOC, DySiON, HoSiOC, HoSiOCN, ErSiOC, ErSiON, TmSiOC, TmSiOCN, YbSiOC, YbSiOCN, LuSiOC, and LuSiOCN. Incidentally, the composition of all the interface films was optimized so as to lower the extinction coefficient. Tests equal to those applied in Example 1 were applied to the discs thus manufactured. The results of the tests are shown in Tables 3 to 6. As is apparent from these tables, the disc prepared in any of these Examples was satisfactory in CNR and SbER.

Comparative Examples 1 to 5

A disc that did not include an interface film (Comparative Example 1) was prepared. Also, discs of the construction equal to that for Example 1 were prepared by using the conventional materials for the interface film (Comparative Examples 2 to 5). The materials of the interface films used in Comparative Examples 2 to 5 were SiC, $Ta_2O_5$+SiC, GeN, and GeCrN, respectively. The tests equal to those applied in Example 1 were applied to the discs thus manufactured. The results of the tests are shown in Table 6. As is apparent from Table 6, the disc prepared in any of these Comparative Examples was not satisfactory in any of the CNR value and the SbER value.

TABLE 3

| | Interface film | Extinction coefficient | Before environmental test CNR [dB] | Before environmental test SbER | After OW Test SbER | After environmental test SbER |
|---|---|---|---|---|---|---|
| Example 10 | HfSiOCN | $1.1 \times 10^{-6}$ | 54.4 | $2.1 \times 10^{-5}$ | $2.8 \times 10^{-5}$ | $2.9 \times 10^{-5}$ |
| Example 11 | HfSiON | $1.0 \times 10^{-6}$ | 54.0 | $2.5 \times 10^{-5}$ | $2.4 \times 10^{-5}$ | $2.7 \times 10^{-5}$ |
| Example 13 | ZrSiOC | $1.2 \times 10^{-5}$ | 53.8 | $2.4 \times 10^{-5}$ | $3.0 \times 10^{-5}$ | $3.4 \times 10^{-5}$ |
| Example 14 | ZrSiOCN | $1.4 \times 10^{-5}$ | 53.3 | $2.4 \times 10^{-5}$ | $3.1 \times 10^{-5}$ | $3.5 \times 10^{-5}$ |
| Example 15 | TiSiOC | $1.2 \times 10^{-5}$ | 52.7 | $2.3 \times 10^{-5}$ | $3.1 \times 10^{-5}$ | $3.3 \times 10^{-5}$ |
| Example 16 | TiSiON | $1.2 \times 10^{-5}$ | 52.9 | $2.3 \times 10^{-5}$ | $3.0 \times 10^{-5}$ | $3.1 \times 10^{-5}$ |
| Example 17 | NbSiOC | $1.0 \times 10^{-5}$ | 53.6 | $2.3 \times 10^{-5}$ | $3.4 \times 10^{-5}$ | $3.5 \times 10^{-5}$ |
| Example 18 | NbSiOCN | $1.1 \times 10^{-5}$ | 53.5 | $2.3 \times 10^{-5}$ | $3.5 \times 10^{-5}$ | $3.5 \times 10^{-5}$ |
| Example 19 | AlSiOC | $1.0 \times 10^{-5}$ | 53.6 | $2.1 \times 10^{-5}$ | $2.9 \times 10^{-5}$ | $3.5 \times 10^{-5}$ |
| Example 20 | AlSiOCN | $1.3 \times 10^{-5}$ | 53.8 | $2.1 \times 10^{-5}$ | $3.5 \times 10^{-5}$ | $3.5 \times 10^{-5}$ |
| Example 21 | ZnSiOC | $1.1 \times 10^{-5}$ | 53.2 | $2.3 \times 10^{-5}$ | $3.4 \times 10^{-5}$ | $3.4 \times 10^{-5}$ |
| Example 22 | ZnSiOCN | $1.2 \times 10^{-5}$ | 52.8 | $2.4 \times 10^{-5}$ | $3.5 \times 10^{-5}$ | $3.5 \times 10^{-5}$ |

TABLE 4

| | Interface film | Extinction coefficient | Before environmental test CNR [dB] | Before environmental test SbER | After OW Test SbER | After environmental test SbER |
|---|---|---|---|---|---|---|
| Example 23 | YSiOC | $0.9 \times 10^{-5}$ | 52.7 | $2.1 \times 10^{-5}$ | $3.2 \times 10^{-5}$ | $3.5 \times 10^{-5}$ |
| Example 24 | YSiON | $0.9 \times 10^{-5}$ | 53.1 | $2.2 \times 10^{-5}$ | $3.5 \times 10^{-5}$ | $3.4 \times 10^{-5}$ |
| Example 25 | LaSiOC | $0.8 \times 10^{-5}$ | 53.0 | $2.1 \times 10^{-5}$ | $3.1 \times 10^{-5}$ | $3.4 \times 10^{-5}$ |
| Example 26 | LaSiOCN | $0.9 \times 10^{-5}$ | 52.0 | $2.2 \times 10^{-5}$ | $3.2 \times 10^{-5}$ | $3.3 \times 10^{-5}$ |
| Example 27 | CeSiOC | $0.7 \times 10^{-5}$ | 52.9 | $2.1 \times 10^{-5}$ | $3.1 \times 10^{-5}$ | $3.3 \times 10^{-5}$ |
| Example 28 | CeSiON | $0.7 \times 10^{-5}$ | 53.7 | $2.3 \times 10^{-5}$ | $3.1 \times 10^{-5}$ | $3.1 \times 10^{-5}$ |

TABLE 4-continued

|  | Interface film | Extinction coefficient | Before environmental test CNR [dB] | Before environmental test SbER | After OW Test SbER | After environmental test SbER |
|---|---|---|---|---|---|---|
| Example 29 | PrSiOC | $1.1 \times 10^{-5}$ | 53.6 | $2.4 \times 10^{-5}$ | $3.3 \times 10^{-5}$ | $3.2 \times 10^{-5}$ |
| Example 30 | PrSiON | $1.2 \times 10^{-5}$ | 53.5 | $2.5 \times 10^{-5}$ | $3.2 \times 10^{-5}$ | $3.4 \times 10^{-5}$ |
| Example 31 | SmSiOC | $1.9 \times 10^{-5}$ | 52.9 | $2.5 \times 10^{-5}$ | $3.5 \times 10^{-5}$ | $3.5 \times 10^{-5}$ |
| Example 32 | SmSiOCN | $2.1 \times 10^{-5}$ | 54.0 | $2.4 \times 10^{-5}$ | $3.4 \times 10^{-5}$ | $3.5 \times 10^{-5}$ |
| Example 33 | EuSiOC | $2.2 \times 10^{-5}$ | 53.0 | $2.1 \times 10^{-5}$ | $3.4 \times 10^{-5}$ | $3.5 \times 10^{-5}$ |
| Example 34 | EuSiON | $2.3 \times 10^{-5}$ | 53.3 | $2.1 \times 10^{-5}$ | $3.5 \times 10^{-5}$ | $3.5 \times 10^{-5}$ |

TABLE 5

|  | Interface film | Extinction coefficient | Before environmental test CNR [dB] | Before environmental test SbER | After OW test SbER | After environmental test SbER |
|---|---|---|---|---|---|---|
| Example 35 | GdSiOC | $2.2 \times 10^{-5}$ | 53.4 | $2.0 \times 10^{-5}$ | $3.1 \times 10^{-5}$ | $3.4 \times 10^{-5}$ |
| Example 36 | GdSiOCN | $2.2 \times 10^{-5}$ | 52.9 | $2.0 \times 10^{-5}$ | $3.3 \times 10^{-5}$ | $3.4 \times 10^{-5}$ |
| Example 37 | TbSiOC | $2.4 \times 10^{-5}$ | 53.6 | $2.2 \times 10^{-5}$ | $3.1 \times 10^{-5}$ | $3.5 \times 10^{-5}$ |
| Example 38 | TbSiOCN | $2.6 \times 10^{-5}$ | 52.7 | $2.0 \times 10^{-5}$ | $3.2 \times 10^{-5}$ | $3.5 \times 10^{-5}$ |
| Example 39 | DySiOC | $2.2 \times 10^{-5}$ | 52.0 | $2.4 \times 10^{-5}$ | $3.2 \times 10^{-5}$ | $3.5 \times 10^{-5}$ |
| Example 40 | DySiON | $2.5 \times 10^{-5}$ | 52.8 | $2.5 \times 10^{-5}$ | $3.5 \times 10^{-5}$ | $3.5 \times 10^{-5}$ |
| Example 41 | HoSiOC | $2.4 \times 10^{-5}$ | 52.9 | $2.6 \times 10^{-5}$ | $3.4 \times 10^{-5}$ | $3.4 \times 10^{-5}$ |
| Example 42 | HoSiOCN | $2.2 \times 10^{-5}$ | 52.8 | $2.4 \times 10^{-5}$ | $3.3 \times 10^{-5}$ | $3.4 \times 10^{-5}$ |
| Example 43 | ErSiOC | $2.2 \times 10^{-5}$ | 52.9 | $2.3 \times 10^{-5}$ | $3.2 \times 10^{-5}$ | $3.4 \times 10^{-5}$ |
| Example 44 | ErSiON | $2.2 \times 10^{-5}$ | 52.8 | $2.1 \times 10^{-5}$ | $3.2 \times 10^{-5}$ | $3.4 \times 10^{-5}$ |
| Example 45 | TmSiOC | $2.3 \times 10^{-5}$ | 52.5 | $2.6 \times 10^{-5}$ | $3.4 \times 10^{-5}$ | $3.4 \times 10^{-5}$ |

TABLE 6

|  | Interface film | Extinction coefficient | Before environmental test CNR [dB] | Before environmental test SbER | After OW Test SbER | After environmental test SbER |
|---|---|---|---|---|---|---|
| Example 46 | TmSiOCN | $2.6 \times 10^{-5}$ | 53.8 | $2.7 \times 10^{-5}$ | $3.5 \times 10^{-5}$ | $3.5 \times 10^{-5}$ |
| Example 47 | YbSiOC | $2.5 \times 10^{-5}$ | 52.2 | $2.6 \times 10^{-5}$ | $3.0 \times 10^{-5}$ | $3.3 \times 10^{-5}$ |
| Example 48 | YbSiOCN | $2.2 \times 10^{-5}$ | 52.4 | $2.8 \times 10^{-5}$ | $3.1 \times 10^{-5}$ | $3.4 \times 10^{-5}$ |
| Example 49 | LuSiOC | $2.1 \times 10^{-5}$ | 52.2 | $2.9 \times 10^{-5}$ | $3.1 \times 10^{-5}$ | $3.4 \times 10^{-5}$ |
| Example 50 | LuSiOCN | $2.6 \times 10^{-5}$ | 52.7 | $2.6 \times 10^{-5}$ | $3.5 \times 10^{-5}$ | $3.5 \times 10^{-5}$ |
| Comparative Example 1 | none | — | 50.9 | $3.3 \times 10^{-3}$ | $3.6 \times 10^{-3}$ | $3.8 \times 10^{-3}$ |
| Comparative Example 2 | SiC | 1.81 | 48.8 | $5.0 \times 10^{-4}$ | $4.9 \times 10^{-4}$ | $5.6 \times 10^{-4}$ |
| Comparative Example 3 | $Ta_2O_5$ + SiC | 0.11 | 50.1 | $2.8 \times 10^{-4}$ | $4.7 \times 10^{-4}$ | $6.4 \times 10^{-4}$ |
| Comparative Example 4 | GeN | 0.15 | 49.9 | $3.9 \times 10^{-4}$ | $4.1 \times 10^{-4}$ | $4.3 \times 10^{-4}$ |
| Comparative Example 5 | GeCrN | 0.19 | 47.4 | $4.5 \times 10^{-4}$ | $4.6 \times 10^{-4}$ | $4.6 \times 10^{-4}$ |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phase-change optical recording medium, comprising:
    a recording film that brings about reversible phase-change between a crystalline phase and an amorphous phase upon irradiation with light, the recording film having a composition represented by the general formula:

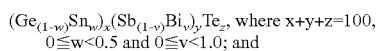
    $(Ge_{(1-w)}Sn_w)_x(Sb_{(1-v)}Bi_v)_yTe_z$, where x+y+z=100, $0 \leq w < 0.5$ and $0 \leq v < 1.0$; and an interface film formed in contact with at least one surface of the recording film and comprising hafnium (Hf), silicon (Si), oxygen (O) and carbon (C), the interface film being represented by the general formula: $HfSi_xO_yC_z$; where $0.1 \leq x \leq 0.4$, $1.8 \leq y \leq 4$ and $0 \leq z \leq 0.5$.

2. A phase-change optical recording medium, comprising:
    a recording film that brings about reversible phase-change between a crystalline phase and an amorphous phase upon irradiation with light, the recording film having a composition represented by the general formula:

$(Ge_{(1-w)}Sn_w)_x(Sb_{(1-v)}Bi_v)_yTe_z$, where $x+y+z=100$, $0 \leq w < 0.5$ and $0 \leq v < 1.0$; and an interface film formed in contact with at least one surface of the recording film and comprising hafnium (Hf), silicon (Si), oxygen (O) and carbon (C), the interface film being represented by the general formula: $HfSi_xO_yC_z$, where $0.1 \leq x \leq 0.2$, $2.5 \leq y \leq 3.5$, and $0 \leq z \leq 0.1$.

* * * * *